(12) United States Patent
Kim et al.

(10) Patent No.: US 9,820,308 B2
(45) Date of Patent: Nov. 14, 2017

(54) APPARATUS AND METHOD FOR CONTROLLING OUTGOING CALLS IN VEHICLE

(71) Applicant: Hyundai Motor Company, Seoul (KR)

(72) Inventors: Tae Myoung Kim, Seoul (KR); Sang Yong Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/169,977

(22) Filed: Jun. 1, 2016

(65) Prior Publication Data
US 2017/0188395 A1 Jun. 29, 2017

(30) Foreign Application Priority Data

Dec. 29, 2015 (KR) .................. 10-2015-0188330

(51) Int. Cl.
*H04W 76/00* (2009.01)
*H04W 4/00* (2009.01)
*H04W 4/04* (2009.01)
*H04W 76/02* (2009.01)
*H04W 76/06* (2009.01)

(52) U.S. Cl.
CPC ......... *H04W 76/007* (2013.01); *H04W 4/008* (2013.01); *H04W 4/046* (2013.01); *H04W 76/023* (2013.01); *H04W 76/066* (2013.01)

(58) Field of Classification Search
CPC ..... H04W 4/22; H04W 76/007; H04W 4/046; H04W 4/008
See application file for complete search history.

(56) References Cited

U.S. PATENT DOCUMENTS

| 9,326,092 | B2 * | 4/2016 | Nelson | H04W 4/008 |
| 2007/0201389 | A1 * | 8/2007 | Murayama | H04W 76/021 370/310 |
| 2010/0197359 | A1 * | 8/2010 | Harris | H04M 1/66 455/569.1 |
| 2012/0190324 | A1 * | 7/2012 | Hatton | H04W 4/22 455/404.1 |
| 2013/0005319 | A1 * | 1/2013 | Sakata | B60R 25/00 455/418 |

(Continued)

FOREIGN PATENT DOCUMENTS

| JP | 2001230883 A | 8/2001 |
| JP | 2007293620 A | 11/2007 |

(Continued)

OTHER PUBLICATIONS

Notice of Allowance for Korean Application No. 10-2015-0188330, dated Jan. 26, 2017, English translation, 1 page.

*Primary Examiner* — Dung Hong
(74) *Attorney, Agent, or Firm* — Mintz Levin Cohn Ferris Glovsky and Popeo, P.C.; Peter F. Corless

(57) ABSTRACT

A method for controlling an outgoing call in a vehicle includes: when a communication terminal connected to a multimedia device through car mirroring has not been registered in a pairing list of the multimedia device, deleting at least one device among a plurality of devices registered in the pairing list, and registering the communication terminal in the pairing list; and attempting to make a call through the communication terminal when it has been registered in the pairing list.

13 Claims, 10 Drawing Sheets

(56) References Cited

U.S. PATENT DOCUMENTS

| | | | |
|---|---|---|---|
| 2014/0163774 A1* | 6/2014 | Demeniuk | G08C 17/02 701/2 |
| 2014/0206308 A1* | 7/2014 | Hatton | H04W 4/22 455/404.2 |
| 2015/0341766 A1* | 11/2015 | Nelson | H04W 4/22 455/404.2 |
| 2016/0157049 A1* | 6/2016 | Choi | H04W 4/008 455/41.2 |

FOREIGN PATENT DOCUMENTS

| | | |
|---|---|---|
| JP | 2010103918 A | 5/2010 |
| JP | 2011160303 A | 8/2011 |
| KR | 10-2014-0054914 A | 5/2014 |
| KR | 10-1568335 B1 | 11/2015 |
| KR | 10-2015-0145857 A | 12/2015 |
| KR | 10-2016-0037535 A | 4/2016 |

* cited by examiner

FIG. 5
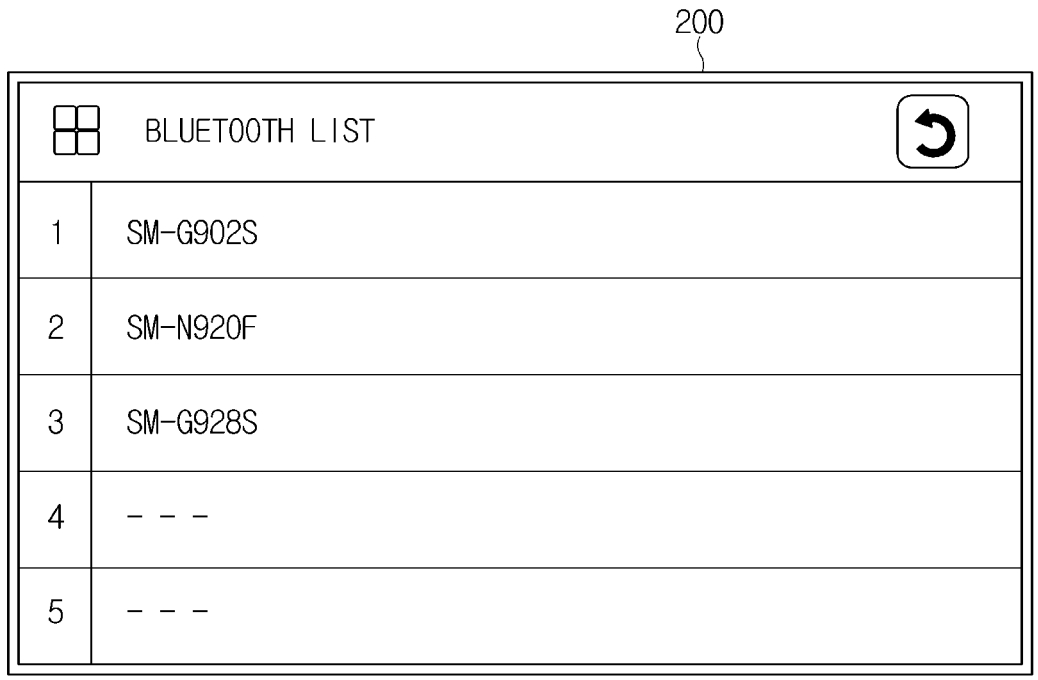
(A)
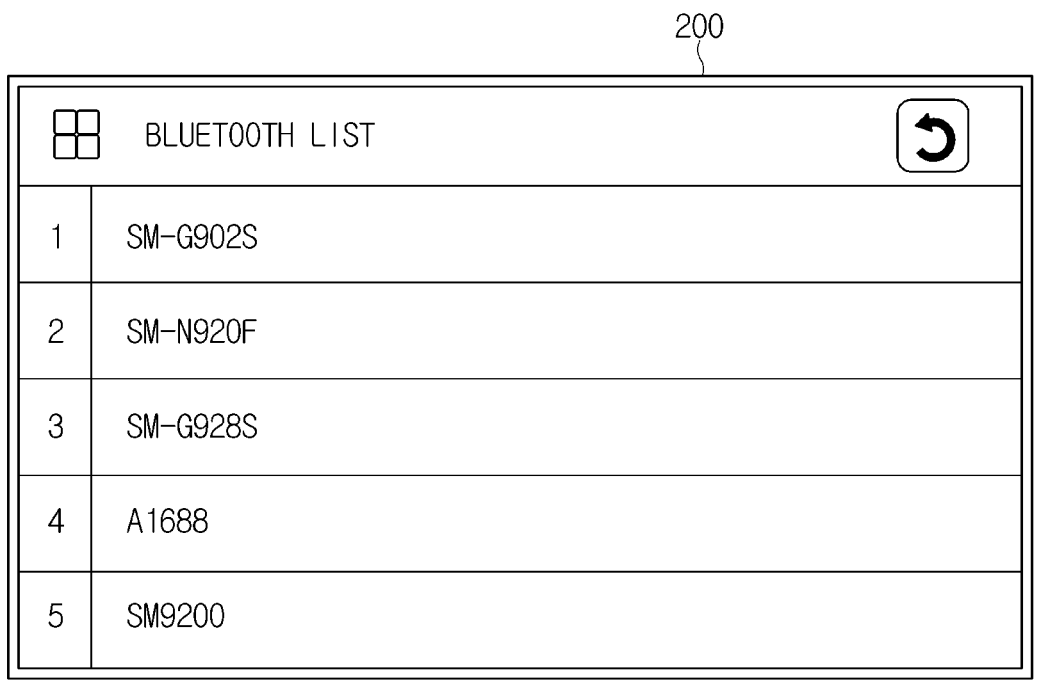
(B)

APPARATUS AND METHOD FOR CONTROLLING OUTGOING CALLS IN VEHICLE

CROSS-REFERENCE TO RELATED APPLICATION

This application claims the benefit of and priority to Korean Patent Application No. 10-2015-0188330, filed on Dec. 29, 2015 in the Korean Intellectual Property Office, the disclosure of which is incorporated herein by reference in its entirety.

BACKGROUND

1. Technical Field

Embodiments of the present disclosure relate generally to a vehicle, and more particularly, to a method of controlling outgoing calls of a communication terminal connected to a multimedia device of a vehicle.

2. Description of the Related Art

As is generally known, telematics refers to a combination of telecommunications and infomatics. A telematics system is an integrated information system in which various information is combined with wireless mobile communication (e.g., High-Speed Downlink Packet Access (HSDPA) or Wideband Code Division Multiple Access (WCDMA)) and a Global Positioning System (GPS). A telematics system for vehicles was developed as a result of the propagation of the Internet and the development of digital mobile communication technologies.

Due to the emergence of telematics, vehicles which were previously considered a "information discontinuity space" have changed to a platform of mobile communication in which various information lives and breathes. Telematics connects a vehicle with a driver organically through a wireless network to enable the driver to use various kinds of information and services, such as the Internet, E-mail, traffic information, calls, route guidance (i.e., navigation), notification about traffic accidents, life information, theft detection (e.g., stolen vehicle tracking), voice memos, etc. As such, telematics plays an important role in making a vehicle as a new and safe living space.

As one of the many telematics services, there is a service for automatically making a call by dialing a pre-registered telephone number, such as 911 or an emergency rescue service of insurance company, when a vehicle encounters a traffic accident. In order to provide such a service, a multimedia device of a vehicle attempts to automatically make an emergency call through a paired communication terminal. However, if the communication terminal has not been registered in a pairing list of the multimedia device, although the communication terminal is connected to the multimedia device through car mirroring, no emergency call can be made. Therefore, it can be difficult to promptly deal with a traffic accident.

SUMMARY

It is an aspect of the present disclosure to provide a method of automatically registering a communication terminal and making an emergency call in the state that the communication terminal is connected to a multimedia device through car mirroring, even though the communication terminal has not been registered in a pairing list of the multimedia device.

Additional aspects of the disclosure will be set forth in part in the description which follows and, in part, will be apparent from the description, or may be learned by practice of the disclosure.

In accordance with embodiments of the present disclosure, a method for controlling an outgoing call in a vehicle includes: when a communication terminal connected to a multimedia device through car mirroring has not been registered in a pairing list of the multimedia device, deleting at least one device among a plurality of devices registered in the pairing list, and registering the communication terminal in the pairing list; and attempting to make a call through the communication terminal when it has been registered in the pairing list.

The method may further include deleting the at least one device among the plurality of devices registered in the pairing list when the pairing list includes no area in which the communication terminal can be registered.

The deleting of the at least one device among the plurality of devices registered in the pairing list may include deleting a device that was last registered among the plurality of devices registered in the pairing list.

The deleting of the at least one device among the plurality of devices registered in the pairing list may include deleting a device having a lowest priority among the plurality of devices registered in the pairing list.

The deleting of the at least one device among the plurality of devices registered in the pairing list may include deleting a device having a smallest number of call connections among the plurality of devices registered in the pairing list.

The deleting of the at least one device among the plurality of devices registered in the pairing list may include deleting a device with which a last call connection has been established at an earliest time among the plurality of devices registered in the pairing list.

The call may be an automatic outgoing call for automatically dialing a predetermined telephone number when the vehicle encounters a traffic accident.

The method may further include, when the communication terminal was already registered in the pairing list of the multimedia device, attempting to make a call through the communication terminal.

The method may further include, when the pairing list includes an area in which the communication terminal can be registered, registering the communication terminal in the pairing list, and attempting to make a call through the communication terminal.

Furthermore, in accordance with embodiments of the present disclosure, an apparatus for making a call in a vehicle includes: a multimedia device including a controller; and a communication terminal connected to the multimedia device through car mirroring. When the communication terminal has not been registered in a pairing list of the multimedia device, the controller of the multimedia device deletes at least one device among a plurality of devices registered in the pairing list, registers the communication terminal in the pairing list, and attempts to make a call through the communication terminal when it has been registered in the pairing list.

When the pairing list includes no area in which the communication terminal can be registered, the controller may delete the at least one device among the plurality of devices registered in the pairing list.

The controller may delete a device that was last registered among the plurality of devices registered in the pairing list.

The controller may delete a device having a lowest priority among the plurality of devices registered in the pairing list.

The controller may delete a device having a smallest number of call connections among the plurality of devices registered in the pairing list.

The controller may delete a device with which a last call connection has been established at an earliest time among the plurality of devices registered in the pairing list.

The call may be an automatic outgoing call for automatically dialing a predetermined telephone number when the vehicle encounters a traffic accident.

If the communication terminal was already registered in the pairing list of the multimedia device, the controller may attempt to make a call through the communication terminal.

If the pairing list includes an area in which the communication terminal can be registered, the controller may register the communication terminal in the pairing list, and attempt to make a call through the communication terminal.

Furthermore, in accordance with embodiments of the present disclosure, a method for controlling an outgoing call in a vehicle includes: when a communication terminal connected to a multimedia device through car mirroring has not been registered in a pairing list of the multimedia device, deleting a device that was last registered among a plurality of devices registered in the pairing list, and registering the communication terminal in the pairing list; and attempting to make a call through the communication terminal when it has been registered in the pairing list.

Furthermore, in accordance with embodiments of the present disclosure, a method for controlling an outgoing call in a vehicle includes: when a communication terminal connected to a multimedia device through car mirroring has not been registered in a pairing list of the multimedia device, deleting a device having a lowest priority among a plurality of devices registered in the pairing list, and registering the communication terminal in the pairing list; and attempting to make a call through the communication terminal when it has been registered in the pairing list.

Furthermore, in accordance with embodiments of the present disclosure, a method for controlling an outgoing call in a vehicle includes: when a communication terminal connected to a multimedia device through car mirroring has not been registered in a pairing list of the multimedia device, deleting a device having a smallest number of call connections among a plurality of devices registered in the pairing list, and registering the communication terminal in the pairing list; and attempting to make a call through the communication terminal when it has been registered in the pairing list.

Furthermore, in accordance with embodiments of the present disclosure, a method for controlling an outgoing call in a vehicle includes: when a communication terminal connected to a multimedia device through car mirroring has not been registered in a pairing list of the multimedia device, deleting a device with which a last call connection has been established at an earliest time among a plurality of devices registered in the pairing list, and registering the communication terminal in the pairing list; and attempting to make a call through the communication terminal when it has been registered in the pairing list Furthermore, in accordance with embodiments of the present disclosure, a method for controlling an outgoing call in a vehicle includes: when a communication terminal is connected to a multimedia device through car mirroring, determining whether a pairing list of the multimedia device includes an area in which the communication terminal can be registered; when the pairing list includes no area in which the communication terminal can be registered, and the communication terminal has already been registered in the pairing list, attempting to make a call through the communication terminal; when the pairing list includes the area in which the communication terminal can be registered, registering the communication terminal in the area of the pairing list, and attempting to make a call through the communication terminal; and when the pairing list includes no area in which the communication terminal can be registered, and the communication terminal has not been registered in the pairing list, deleting at least one device among a plurality of devices registered in the pairing list to create an area in the pairing list in which the communication terminal can be registered, registering the communication terminal in the created area of the pairing list, and attempting to make a call through the communication terminal.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 shows pairing lists of an AVN of a vehicle according to embodiments of the present disclosure;

DETAILED DESCRIPTION OF THE EMBODIMENTS

Figure 1:
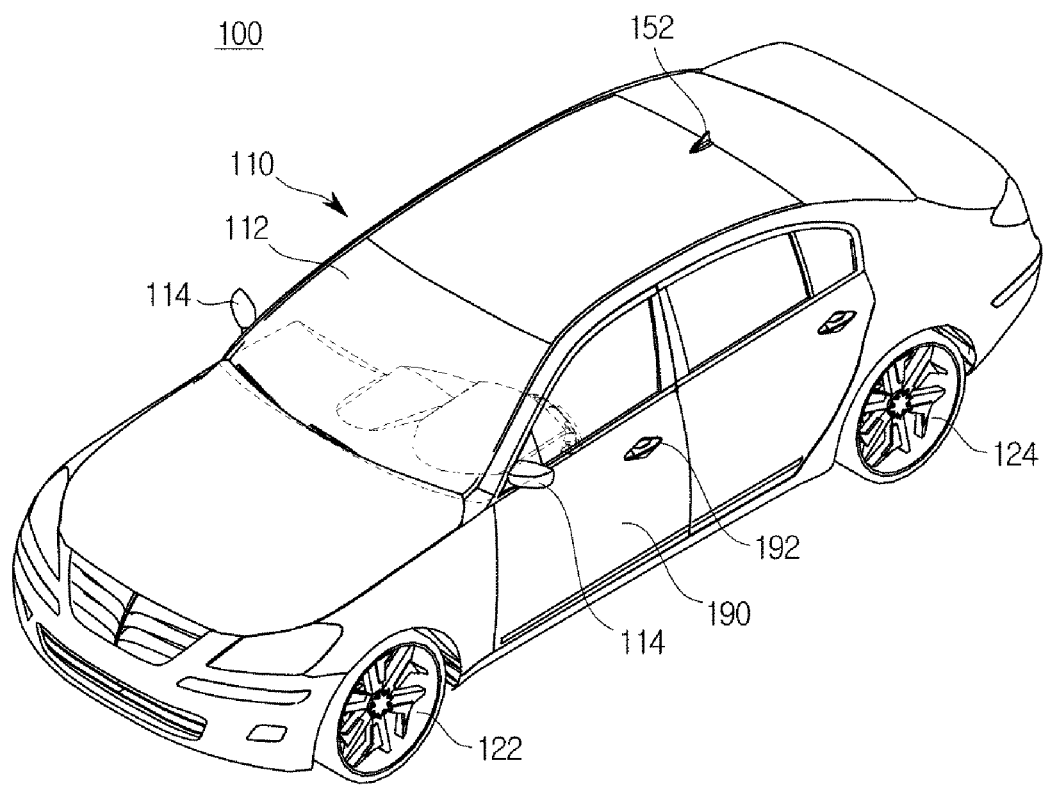
FIG. 1 shows a vehicle according to embodiments of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the presently disclosed embodiments, FIG. 1 shows a vehicle according to embodiments of the present disclosure. As shown in FIG. 1, a vehicle 100, as is known in the art, may include a main body 110 forming the outer appearance of the vehicle 100, a windshield 112 to provide a passenger with a front view of the vehicle 100 and to protect him/her from wind, side-view mirrors 114 to provide a passenger with side and rear-side views of the vehicle 100, doors 190 to shield the interior of the vehicle 100 from the outside, an antenna 152 for communication, front wheels 122 disposed in the front part of the vehicle 100, and rear wheels 124 disposed in the rear part of the vehicle 100.

The windshield 112 may be provided in the upper, front part of the main body 110 to allow a passenger inside the vehicle 10 to acquire a front view of the vehicle 100. The side-view mirrors 114 may be respectively provided in the left and right doors 190. The passenger of the vehicle 100 may also acquire visual information about side and rear-side views of the vehicle 100 through the side-view mirrors 114.

The doors 190 may be rotatably provided to the left and right of the main body 110 to allow the passenger to open one of them and get into the vehicle 100. Also, the doors 190 may shield the interior of the vehicle 100 from the outside when all of them close. The doors 190 may be locked or unlocked by a door locking device 192. The door locking device 192 may lock or unlock the doors 190 when a user approaches the vehicle 100 to manipulate a button or lever of the door locking device 192 or when a user uses a remote controller or the like at a place away from the vehicle 100 to lock/unlock the doors 190 remotely.

The antenna 152 may be used to receive broadcasting/communication signals for telematics, Digital Multimedia Broadcasting (DMB), digital TeleVision (TV), Global Positioning System (GPS), etc. The antenna 152 may be a multi-function antenna to receive various kinds of broadcasting/communication signals or a single-function antenna to receive one kind of broadcasting/communication signals. Notably, the exterior arrangement of the vehicle 100 as described above and shown in FIG. 1 is merely for demonstration purposes and should not be treated as limiting the scope of the present claims.

Figure 2:
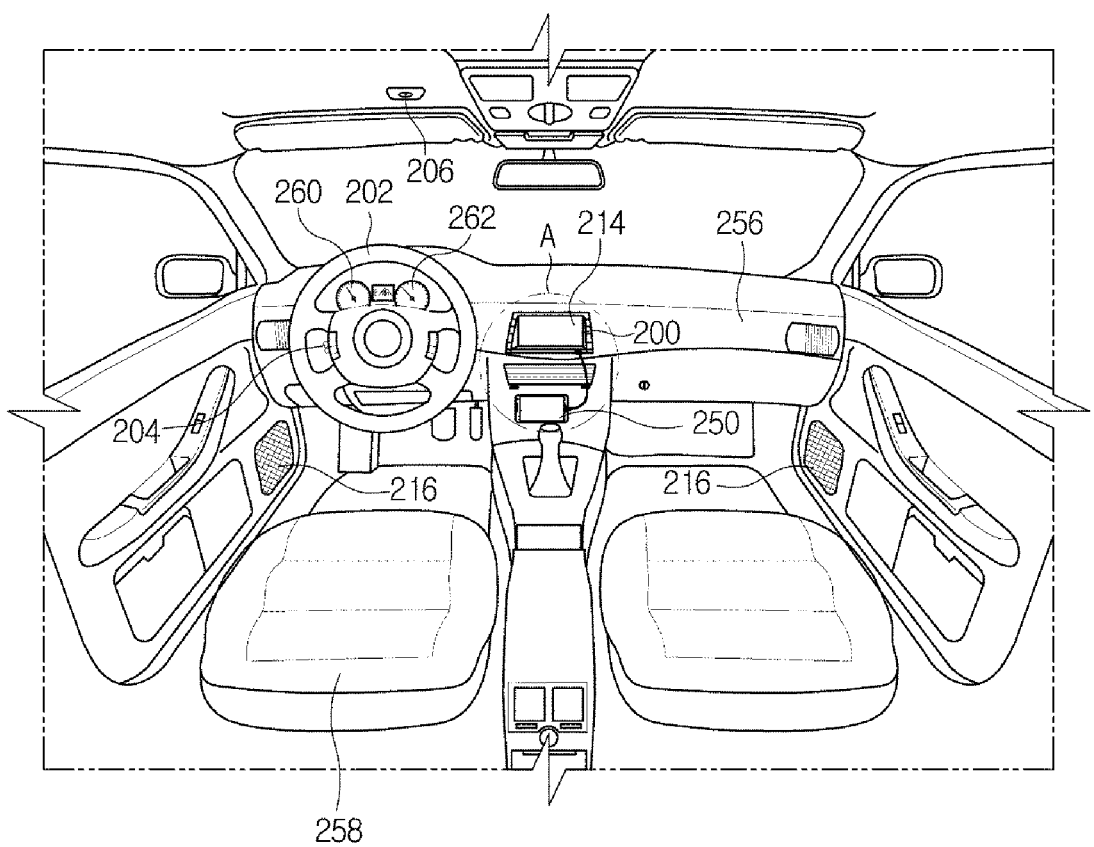
FIG. 2 shows an interior of the vehicle shown in FIG. 1.

FIG. 2 shows an interior of the vehicle 100 shown in FIG. 1. As shown in FIG. 2, the interior of the vehicle 100 may include a dashboard 256 on which various kinds of instruments enabling a passenger to operate the vehicle 100 are installed, a driver seat 258 on which an operator or passenger (i.e., a driver) sits, cluster display units 260 and 262 to display operation information of the vehicle 100, and an Audio-video-navigation (AVN) 200 which is a multimedia device to perform various multimedia functions according to the passenger's operation command. The AVN (200) may be an audio player, for example. The AVN 200 can perform a navigation function for route guidance, an audio function, and a video function. However, the AVN 200 may be replaced with a head unit of a mobile device supporting car mirroring although the head unit does not support any one of the audio, video, and navigation functions.

The dashboard 256 may protrude from the lower end of the windshield 112 toward the passenger so that the passenger can manipulate various instruments installed on the dashboard 256 while keeping eyes forward.

The driver seat 258 may be disposed behind the dashboard 256 so that the passenger (i.e., the driver) can operate the vehicle 100 in a comfortable position while keeping his/her eyes forward and on the various instruments of the dashboard 256.

The cluster display units 260 and 262 may be disposed on the dashboard 256 near the driver seat 258, and may include a speedometer 260 to display speed of the vehicle 100 and a tachometer 262 to display Revolutions Per Minute (RPM) of en engine (not shown).

The AVN 200 may include a display unit 214 to display information about a road on which the vehicle 100 travels or a route to a destination at which the passenger wants to arrive, and a speaker 216 to output sound according to the passenger's operation command. Also, the AVN 200 allows short-range wireless communication so as to transmit/receive information to/from an external device 250 which the passenger possesses through short-range wireless communication. For data transmission/reception through short-range wireless communication, the external device 250 may also need to be able to perform short-range wireless communication with the AVN 200. Also, the AVN 200 may connect to the external device 250 in a wired fashion such as a Universal Serial Bus (USB) cable. The AVN 200 may be based on voice recognition control. For voice recognition control, a voice recognition button 204 may be installed on a steering wheel 202, and a microphone 206 may be installed over the driver seat 258. The voice recognition button 204, the microphone 206, and the speaker 216 may be used as support devices for voice recognition control.

In FIG. 2, the AVN 200 may be connected to the external device 250 to communicate with the external device 250. The external device 250 that can be connected to the AVN 200 to communicate with the AVN 200 may be a mobile device (e.g., a smart phone or a tablet PC), or an external storage device (e.g., an external Hard Disk Drive (HDD), an external Solid State Device (SSD), and a USB memory). Also, an Internet of Things (IoT) device and a streaming service provider may be connected as the external device 250 to the AVN 200. The AVN 200 may receive multimedia content from the external device 250, and display the multimedia content through a display unit 214 of the AVN 200.

There may be various methods of transmitting multimedia content from the external device 250 to the AVN 200 and reproducing the multimedia content on the AVN 200. For example, a method of transmitting multimedia content from the external device 250 to the AVN 200 through a wired/wireless communication channel established between the external device 250 and the AVN 200, and reproducing the received multimedia content on the AVN 200 can be used.

Also, another method of displaying a mirroring image of multimedia content being reproduced on the external device 250 through the display unit 214 of the AVN 200 in the state that an wired/wireless communication channel is established between the external device 250 and the AVN 200 may be used. For example, if the external device 250 is a mobile device supporting car mirroring, such as Apple's CarPlay or Google's Android Auto, an image of video content or a screen of navigation reproduced on the mobile device may be mirrored on the display unit 214 of the AVN 200. Notably, the interior arrangement of the vehicle 100 as described above and shown in FIG. 2 is merely for demonstration purposes and should not be treated as limiting the scope of the present claims.

Figure 3:
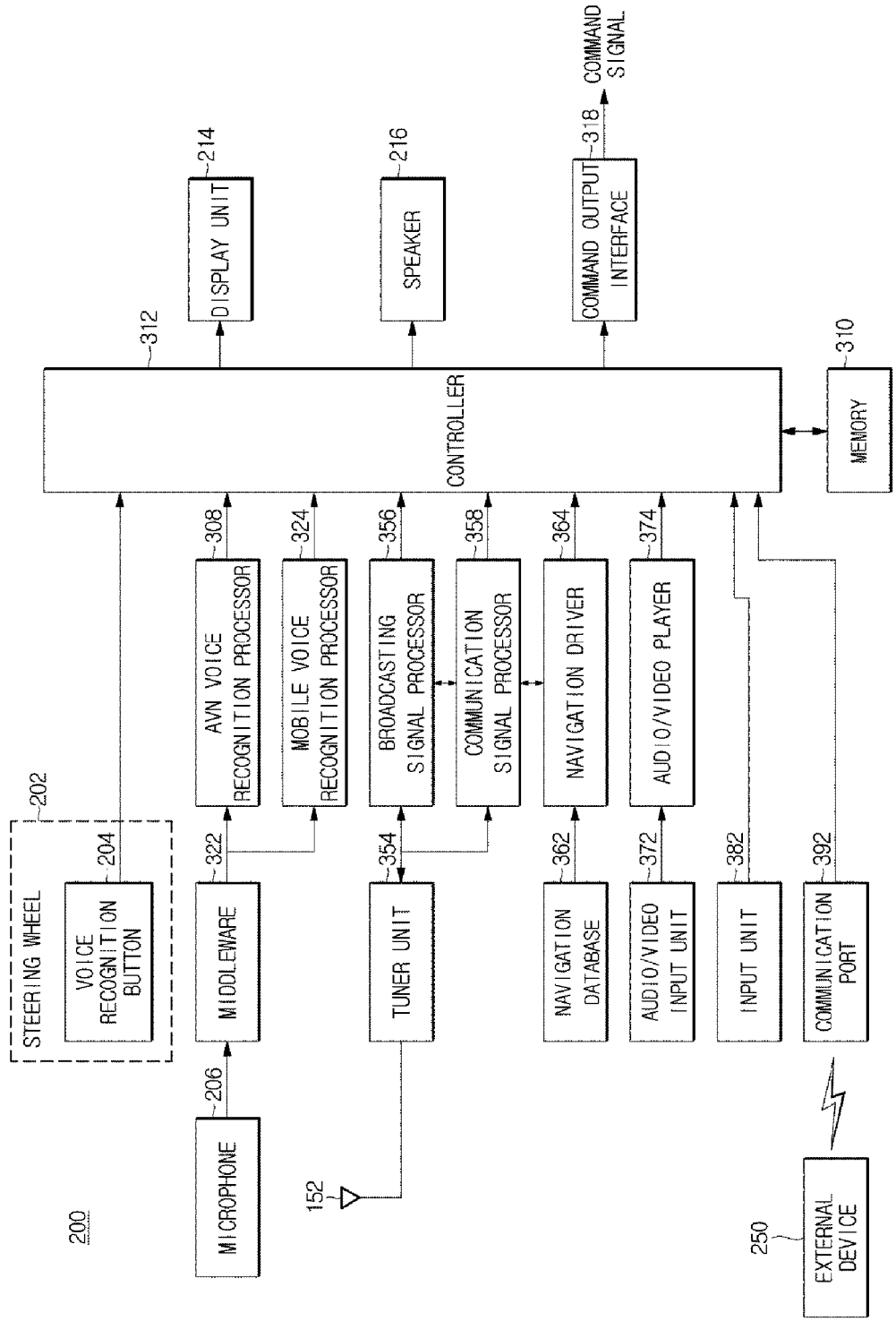
FIG. 3 is a block diagram showing a configuration of an Audio-video-navigation (AVN) of a vehicle according to embodiments of the present disclosure.

FIG. 3 is a block diagram showing a configuration of the AVN 200 of the vehicle 100 according to embodiments of the present disclosure. In the vehicle 100, the AVN 200 may include all of an audio function, a video function, and a navigation function; however, the AVN 200 may be replaced with a head unit of a mobile device supporting car mirroring although the head unit does not support any one of the audio, video, and navigation functions.

As shown in FIG. 3, the AVN 200 may be greatly divided into parts, such as a part for a voice recognition function, a part for a general input function, a part for a broadcast/communication function, a part for a navigation function, a part for an audio/video function, and a part that can be used in common for a plurality of functions.

The part for the voice recognition function may include the voice recognition button 204, the microphone 206, middleware 322, a voice recognition processor 308, and a command output interface 318. Also, a mobile voice recognition processor 324 installed at a server in a remote site may be communicatively connected to the middleware 322 and the controller 312 through the external device 250 such as a mobile terminal. The part for the broadcast/communication function may include the antenna 152, a tuner unit 354, a broadcasting signal processor 356, and a communication signal processor 358. The part for the navigation function may include navigation database 362 and a navigation driver 364. The part for the audio/video function may include an audio/video input unit 372 and an audio/video player 374. The part for the general input function may include an input unit 372. The part that can be used in common for the plurality of functions may include a memory 310, the controller 312, the display unit 214, and the speaker 216. However, the configuration of the AVN 200 is not limited to this. For example, a part for a specific function may be used for another function.

The voice recognition button 204 may enable a passenger to execute the audio function, the video function, the navigation function, the information communication function, etc. of the AVN 200. For this, the voice recognition button 204 may support one-key operation based on Push-To-Talk (PTT). The voice recognition button 204 may be installed on the steering wheel 202 so that the passenger can operate the voice recognition button 204 conveniently during driving. The steering wheel 202 may be used to move the wheels of the vehicle 100 to the left or right to change the heading direction of the vehicle 100. Since the passenger (i.e., the driver) always grips the steering wheel 202 during driving, the passenger can manipulate the voice recognition button 204 conveniently during driving if the voice recognition button 204 is installed on the steering wheel 202. However, the voice recognition button 204 may be installed at any location of the vehicle 100 at which the passenger can manipulate the voice recognition button 204 conveniently during driving.

The microphone 206 may receive a voice signal uttered by the passenger when a voice recognition control function is executed, and convert the received voice signal into an electrical signal. The microphone 206 may be separately provided for voice recognition control, or may be a hands-free microphone of the vehicle 100. Also, the microphone 206 may be a microphone of a mobile terminal which the passenger possesses. When a microphone of a mobile terminal which the passenger possesses is used, the mobile terminal may need to be connected to the AVN 200 through short-range communication such as Bluetooth.

The voice recognition processor 308 of the AVN 200 may receive the electrical signal converted by the microphone 206 through the middleware 322, and perform voice recognition on the electrical signal to extract text data as voice command information that is the result of the voice recognition. The text data extracted by the voice recognition processor 308 may be transferred to the middleware 322 before it is transferred to the controller 312.

The middleware 322, which can include a relay means, may determine whether the text data received from the voice recognition processor 308 of the AVN 200 is a reserved word for voice recognition control of the AVN 200 or a reserved word for voice recognition control of the external device 250. If the middleware 322 determines that the text data is a reserved word for voice recognition control of the AVN 200, the middleware 322 may transfer the text data to the controller 312 of the AVN 200 to perform voice recognition control of the AVN 200. Meanwhile, if the middleware 322 determines that the text data is a reserved word for voice recognition control of the external device 250, the middleware 322 may transfer the text data to the external device 250 to perform voice recognition control of the external device 250. That is, the middleware 322 may relay a voice signal created by the passenger's utterance by automatically determining whether the voice signal is a reserved word for voice recognition control of the AVN 200 or a reserved word for voice recognition control of the external device 250. At this time, the passenger's intended intervention for distinguishing a reserved word for voice recognition control of the AVN 200 from a reserved word for voice recognition control of the external device 250 is not needed.

The command output interface 318 may be used to transfer a signal of a control command corresponding to voice command information extracted as the result of voice recognition, from the controller 312 to a controlled device.

The antenna 152 may be used to receive electric waves in the air or transmit electric waves to the air, in order to receive broadcasting signals or to transmit and receive communication signals. The antenna 152 may be communicatively connected to the tuner unit 354. Accordingly, electric waves received by the antenna 152 may be transferred to the tuner unit 354. The antenna 152 may be configured with a plurality of different antennal elements in order to receive and transmit different formats of broadcasting/communication signals. According to embodiments of the present disclosure, the antenna 152 may receive DMB signals and also transmit/receive telematics signals based on 3rd Generation (3G)/Long Term Evolution (LTE).

The tuner unit 354 may receive the electric waves received by the antenna 152, and convert the electric waves into an intermediate frequency signal. Also, the tuner unit 354 may convert a data signal that is to be sent into a format that can be propagated to the air, and then send the converted signal to the air through the antenna 152. That is, the tuner unit 354 may perform operation, such as extracting a specific band of signal or combining a data signal with a carrier signal. The tuner unit 354 may receive broadcasting signals, and transmit and receive communication signals. The broadcasting signals may include radio broadcasting signals and DMB signals. The communication signals may include satellite communication signals for satellite communications with a GPS satellite. Also, the communication signals may include communication signals for telematics. The tuner unit 354 may determine what signal it receives and processes according to a control signal transferred from the controller 312.

For example, if the controller 312 generates a control signal for receiving radio broadcasting signals of a specific channel and transfers the control signal to the tuner unit 354, the tuner unit 354 may receive radio broadcasting signals of the corresponding channel in response to the control signal transferred from the controller 312. If the controller 312 transfers a control signal and transmission data for transmitting telematics signals to the tuner unit 354, the tuner unit 354 may convert the transmission data into a format that can be sent to the air, in response to the control signal transferred from the controller 312, and send the converted signal to the air through the antenna 152. Also, the tuner unit 354 may acquire information of a broadcasting channel included in a broadcasting signal. A broadcasting signal input to the tuner unit 354 may include a name of a broadcast channel, a service IDentifier (ID), and broadcast data. The tuner unit 354 may extract the name of the broadcast channel, the service ID, and the broadcast data included in the broadcasting signal, and transfer the name of the broadcast channel, the service ID, and the broadcast data to the broadcasting signal processor 356.

The broadcasting signal processor 356 may divide the broadcasting signal passed through the tuner unit 354 into a video broadcasting signal and an audio broadcasting signal, and perform a series of signal processing operations. The series of signal processing operations that are performed by the broadcasting signal processor 356 may include analog-to-digital conversion, digital-to-analog conversion, operation of converting video data into a signal format that can drive the display unit 214, etc.

The communication signal processor 358 may process satellite communication signals and telematics communication signals. That is, the communication signal processor 358 may convert a received communication signal into a format of data to transfer the converted data to the controller 312, and may receive data that is to be transmitted through the tuner unit 354 and the antenna 152, from the controller 312, to convert the received data into a format of a communication signal.

The navigation database 362 may include data for implementing navigation. The navigation database 362 may be implemented with a memory card or a Digital Versatile Disc (DVD). Also, navigation data provided from a mobile terminal connected through a wired/wireless link (e.g., CarPlay or Android Auto) may be used as the navigation database 362.

The navigation driver 364 may configure a navigation screen on the display unit 214 based on data provided from the navigation database 362. In order to configure such a navigation screen, the navigation driver 354 may receive navigation setting information, such as a destination, a stop, and a route set by a passenger, from the controller 312. Also, the navigation driver 354 may receive information about a current position of the vehicle 100, acquired through communication with a GPS satellite, from the controller 312, in order to implement navigation.

The audio/video input unit 372 may be an optical disc drive. Or, the audio/video input unit 372 may be a USB input/output device or an auxiliary input/output terminal (also called "AUX"). Or, the audio/video input unit 372 may be a Bluetooth device for wireless connection to the external device 250. The mobile terminal connected to the audio/video input unit 372 through Bluetooth may be a mobile phone or a portable digital sound playing device.

The audio/video player 374 may enable audio/video data input through the audio/video input unit 372 to be output to the speaker 216 or the display unit 214. For example, if the audio/video input unit 372 is an optical disk drive, the optical disk drive may read audio/video data written on an optical disk (e.g., Compact Disk (CD), Digital Versatile Disk (DVD), or Blu-ray Disk (BD)) to extract the audio/video data, and the audio/video player 374 may convert the audio/video data extracted by the audio/video input unit 372 into a signal format that can drive the speaker 216 or the display unit 214, and transfer the converted signal to the speaker 216 or the display unit 214 to reproduce the audio/video. Audio/video data provided from another medium than an optical disk may also be converted into a signal format that can drive the speaker 216 or the display unit 214, by the audio/video player 374.

The input unit 382 may be at least one button provided on the AVN 200 or a touch screen implemented on the display unit 214. The passenger can manipulate the input unit 382 to select one of multiple functions of the AVN 200, and to make various settings for performing a desired task according to the selected function. The voice recognition button 204 of the steering wheel 202, as described above, may also be included in at least one button configuring the input unit 382.

The communication port 392 may be a USB port or a FireWire port. By inserting a communication cable into the communication port 392, the AVN 200 may be communicatively connected to the external device 250 connected to the communication cable. Also, the communication port 392 may be a communication port for short-range wireless communication, such as Bluetooth, Wireless Fidelity (WiFi), Zigbee, and Near Field Communication (NFC). The communication port 392 for short-range wireless communication may receive a remote control signal transmitted from a mobile device (for example, a smart phone and a tablet PC), and transfer the remote control signal to the controller 312 of the AVN 200 or another electronic control unit (ECU). The remote control signal may be a remote control signal for locking/unlocking the doors 190 of the vehicle 100, or a remote control signal for starting or stopping the engine.

The controller 312 may control overall operations of the AVN 200. For example, the controller 312 may drive a voice recognition function-related application stored in the memory 310 in response to a manipulation of the voice recognition button 204 to display an initial screen and output a related voice guide message. Also, the controller 312 may receive voice command information provided from the voice recognition processor 308, and generate a control command corresponding to the voice command information to perform control operation corresponding to the voice command information. Also, the controller 312 may process broadcasting/communication signals. If audio/video data generated by processing broadcasting/communication signals needs to be output to the speaker 216 or the display unit 214, the controller 312 may control transferring of the corresponding audio/video data to the speaker 216 or the display unit 214 so that the audio/video data can be output through the speaker 216 or the display unit 214. Also, if the passenger selects the navigation function, the controller 312 may control the navigation database 362, the navigation driver 364, the display unit 214, and the speaker 216 to implement navigation. Also, the controller 312 may control the audio/video player 374 to reproduce audio/video data input through the audio/video input unit 372 and transfer the audio/video data to the speaker 216 or the display unit 214 so that the audio/video data can be output through the speaker 216 or the display unit 214. Also, the controller 312 may convert a name of a broadcast channel extracted from a broadcasting signal by the tuner unit 354, into text, and transfer the text to the voice recognition processor 308.

The memory 310 may store various applications for executing the voice recognition function, the broadcasting/communication function, the navigation function, and the audio/video function of the AVN 200, and also store screen display data, voice data, and sound effect data required for executing the applications.

The display unit 214 may output video involved in execution of the multiple functions of the AVN 200, such as the voice recognition function, the broadcast/communication function, the navigation function, and the audio/video function of the AVN 200. For example, a guide screen, a message, and video data for each function may be output through the display unit 214. Also, the display unit 214 may display a user interface to allow the passenger to manipulate the plurality of functions of the AVN 200. For example, the display unit 214 may display a user interface for allowing a user to manipulate the AVN 200 to perform the navigation function, the broadcast (radio/DMB) function, the air-conditioning function, the audio function, etc. of the AVN 200. However, when the vehicle 100 is running, video content that is displayed on the display unit 214 may be limited in order to cause a driver to concentrate his/her attention on safe driving.

The speaker 216 may output audio involved in execution of the multiple functions of the AVN 200, such as the voice recognition function, the broadcast/communication function, the navigation function, and the audio/video function of the AVN 200. For example, a guide speech, effect sound, and audio data for each function may be output through the speaker 216.

Figure 4:
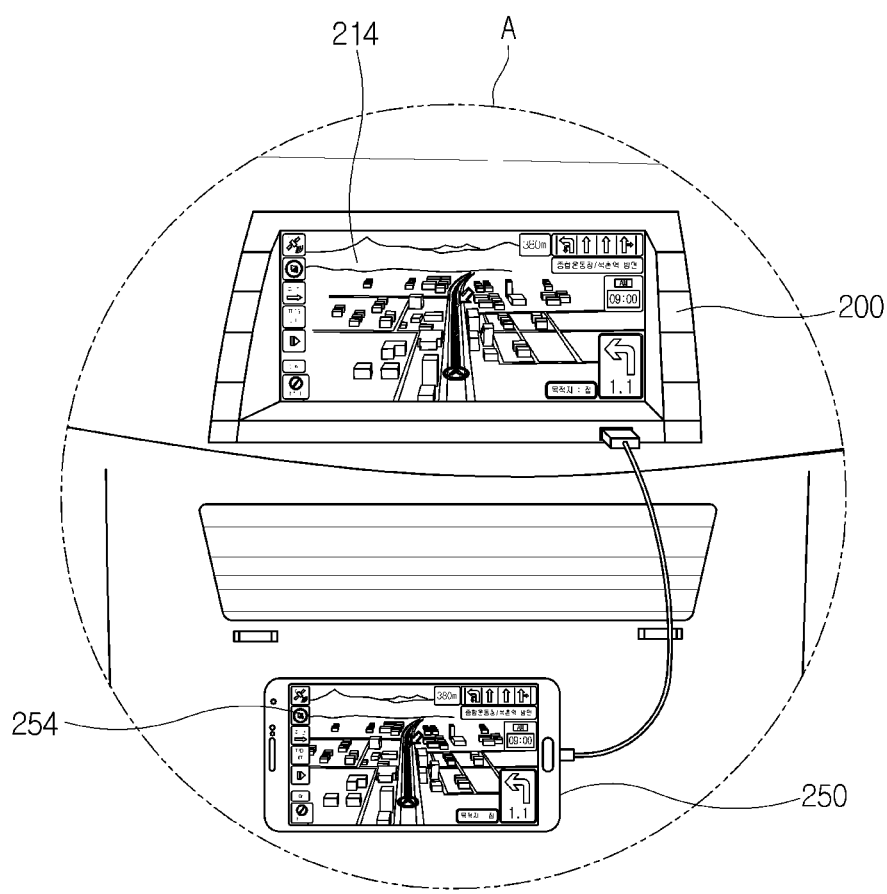
FIG. 4 is a view for describing car mirroring between an external device and an AVN according to embodiments of the present disclosure.

FIG. 4 is a view for describing car mirroring between the external device 250 and the AVN 200 according to embodiments of the present disclosure. The car mirroring may link the AVN 200 of the vehicle 100 to the external device 250 such that content displayed on the display unit 254 of the external device 250 is displayed in the same way on the display unit 214 of the AVN 200. Through the car mirroring, a multimedia content play function, a navigation function, a voice call function, a message receipt confirmation function, etc., which are implemented on the external device 250, may be implemented in the same way on the display unit 214 of the AVN 200. The car mirroring is useful since it enables use of the large display unit 214 of the AVN 200 instead of the small display unit 254 of the external device 250, and enables the AVN 200 to use a voice recognition function supported by the external device 250. Representative car mirroring applications are Apple's CarPlay and Google's Android Auto.

FIG. 5 shows pairing lists of the AVN 200 of the vehicle 100 according to embodiments of the present disclosure. If the AVN 200 is paired with the external device 250 through Bluetooth communication, an identifier (e.g., a model name) of the external device 250 may be registered in a pairing list of the AVN 200, as shown in FIG. 5. The pairing list may be a list of external devices in which interrelations between the AVN 200 and the external devices are established according to information exchange between the AVN 200 and the external devices through short-range communication such as Bluetooth. If short-range communication such as Bluetooth is activated, the external devices registered in the pairing list may be communicatively connected to the AVN 200, automatically or manually. The pairing list of the AVN 200 may be displayed on the display unit 214 of the AVN 200. Also, the number of devices that can be registered in the pairing list of the AVN 200 may be limited. For example, the number of devices that can be registered in the pairing list of the AVN 200 may be limited to five.

FIG. 5A shows a pairing list in which five devices can be registered. In the pairing list of FIG. 5A, three devices have been registered, and two areas in which two devices can be additionally registered are provided, hereinafter referred to as "empty areas." Meanwhile, in a pairing list of FIG. 5B in which five devices can be registered, five devices have already been registered without any empty area in which devices can be additionally registered.

A connection between the AVN 200 and the external device 250 for car mirroring may be established, basically, through a communication cable (e.g., a USB cable). Also, when the external device 250 is connected to the AVN 200 through a USB cable for car mirroring, Bluetooth communication may also be automatically connected between the AVN 200 and the external device 250 if the external device 250 is one of devices registered in the pairing list of the AVN 200.

However, if the external device 250 connected to the AVN 200 through car mirroring has not been registered in the pairing list of the AVN 200, no call through the external device 250 can be made. The reason is because a call can be made only when the external device 250 has been registered in the pairing list of the AVN 200.

If the pairing list of the AVN 200 has empty areas as shown in FIG. 5A so that other devices can be additionally registered in the pairing list, the external device 250 connected through car mirroring can be registered in the pairing list, and then a call can be made through the external device 250.

However, if five devices have already been registered in the pairing list of the AVN 200 so that other devices cannot be additionally registered in the pairing list, as shown in FIG. 5B, the external device 250 connected to the AVN 200 through car mirroring cannot be registered in the pairing list, and accordingly, no call through the external device 250 connected to the AVN 200 through car mirroring can be made.

There is a case in which a driver needs an emergency medical service to urgently call "911" or "emergency rescue service" of insurance company, due to occurrence of a traffic accident. In this case, the driver may try to call "911" or "emergency rescue service" of insurance company using an automatic call service that is supported by a telematics service. In this situation needing an emergency call, if no call can be automatically made for such a reason as described above with reference to FIG. 5B, the driver will not be able to receive any emergency aid. Herein, "911" is a phone number for fire/rescue/first-aid/disaster report/emergency medical service/hospital information service of the National Emergency Management Agency.

In order to resolve the problem, the vehicle 100 according to embodiments of the present disclosure may control the AVN 200 to automatically make a call through the external device 250 connected to the AVN 200 through car mirroring, even when no device can be additionally registered in the pairing list of the AVN 200, as shown in FIG. 5B.

Figure 6:
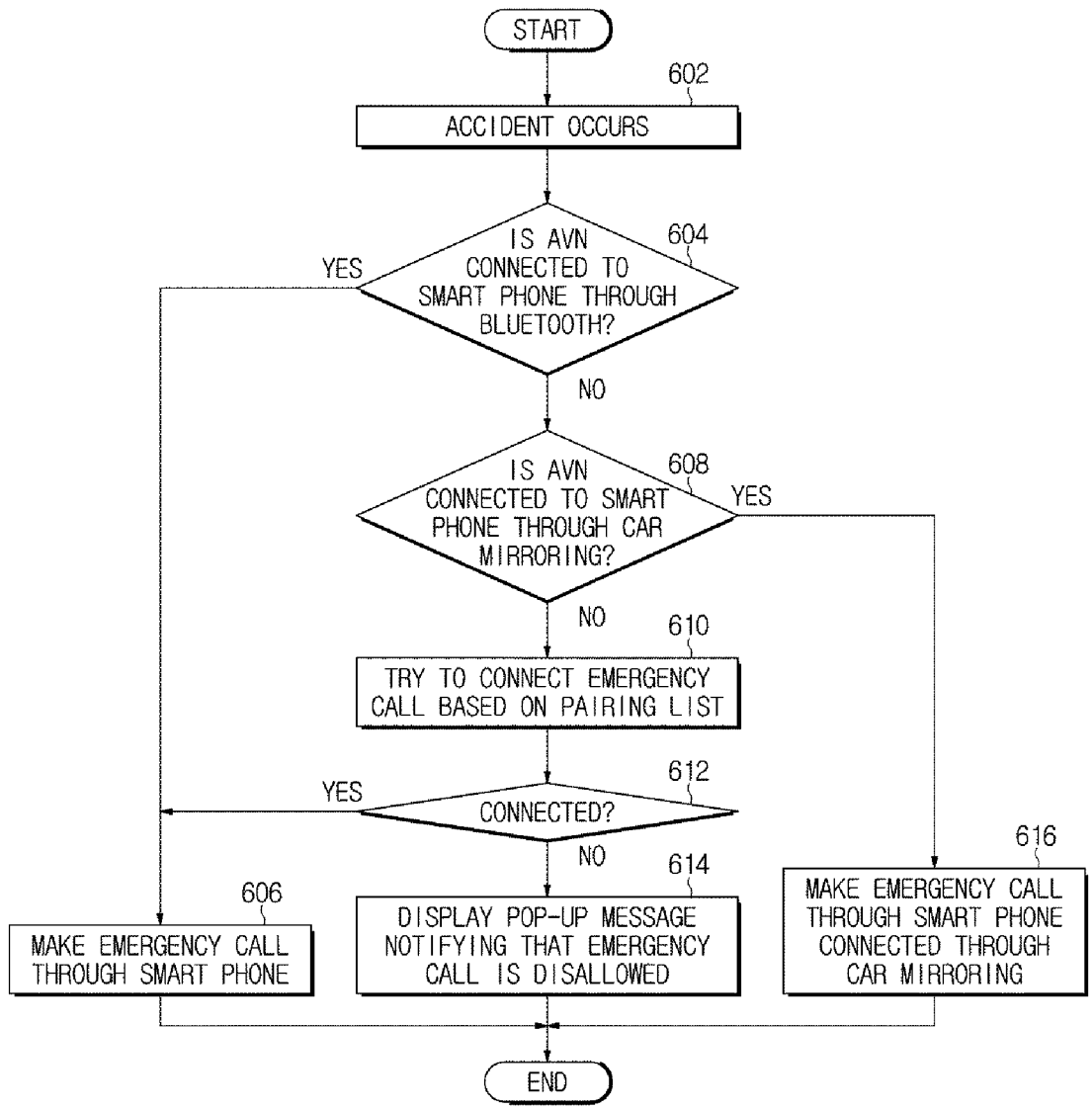
FIG. 6 is a flowchart illustrating a method of automatically controlling an outgoing call in a vehicle according to embodiments of the present disclosure.

FIG. 6 is a flowchart illustrating a method of automatically controlling an outgoing call in the vehicle 100 according to embodiments of the present disclosure. In the method of automatically controlling the outgoing call, as shown in FIG. 6, the external device 250 is assumed to be a smart phone.

The vehicle 100 according to embodiments of the present disclosure may automatically make a call when the vehicle 100 encounters a traffic accident, in operation 602. Whether the vehicle 100 encounters a traffic accident may be determined based on whether an airbag deploys, for example. If the airbag deploys, an Electronic Control Unit (ECU) of the vehicle 100 may determine that the vehicle 100 encounters a traffic accident. If it is determined that the vehicle 100 encounters a traffic accident, the controller 312 may attempt or try to make an emergency call by dialing "911" or "emergency rescue service" of insurance company.

When it is determined that the vehicle 100 encounters a traffic accident, the controller 312 may determine whether the AVN 200 is connected to a smart phone through Bluetooth, in order to make an emergency call, in operation 604.

If it is determined that the AVN 200 is connected to the smart phone through Bluetooth ("Yes" in operation 604), the controller 312 may directly make an emergency call through the smart phone, in operation 606. The emergency call may be made by dialing a predetermined telephone number. For example, if a default number for making an emergency call is "911", the emergency call may be made by dialing "1", "1", and "9" in this order. As another example, if a default number for making an emergency call is "070-XXXX-YYYY" that is a telephone number for an emergency rescue service of insurance company, the emergency call may be made by dialing "0", "7", "0", "X", "X", "X", "X", "Y", "Y", "Y", and "Y" in this order.

Meanwhile, if the AVN 200 is not connected to the smart phone through Bluetooth ("No" in operation 604), the controller 312 may determine whether the AVN 200 is connected to the smart phone through car mirroring, in operation 608.

If the AVN 200 is not connected to the smart phone through car mirroring ("No" in operation 608), the controller 312 may try to connect an emergency call based on a pairing list, in operation 610. For example, if three devices have been registered in the pairing list, as shown in FIG. 5A, the controller 312 may try to make an emergency call through each of the three devices by a predetermined number of times, for example, two times. That is, the controller 312 may make an emergency call two times through SM-G902S which is a first device registered as a first device in the pairing list. If an emergency call is successfully made, the controller 312 may inform a receiver of a situation of the traffic accident. At this time, the controller 312 may provide the receiver with a pre-recorded audio guide message informing the situation of the traffic accident. However, if the trial for making an emergency call through SM-G902S which is the first device registered in the pairing list fails, the controller 312 may try to make an emergency call two times through SM-N920F which is a second device registered in the pairing list. If an emergency call is successfully made, the controller 312 may inform the receiver of the situation of the traffic accident. However, if the trial for making an emergency call through SM-G920F which is the second device registered in the pairing list fails, the controller 312 may try to make an emergency call two times through SM-G928S which is a third device registered in the pairing list.

If an emergency call is connected through any one device among the devices registered in the pairing list ("Yes" in operation 612), the controller 312 may try to directly make an emergency call through the corresponding smart phone, in operation 606.

However, if all trials for connecting an emergency call through the devices registered in the pairing list fail ("No" in operation 612), the controller 312 may display a pop-up message notifying that an emergency call is disallowed, on the display unit 214, in operation 614. The passenger of the vehicle 100 may see the pop-up message to recognize that an emergency call cannot be made.

If the AVN 200 is connected to the smart phone through car mirroring, the controller 312 may try to make an emergency call through the smart phone connected to the AVN 200 through car mirroring, in operation 616. Operation of making an emergency call when the AVN 200 is connected to the smart phone through car mirroring will be described in detail with reference to FIGS. 7, 8, and 9, below.

Figure 7:
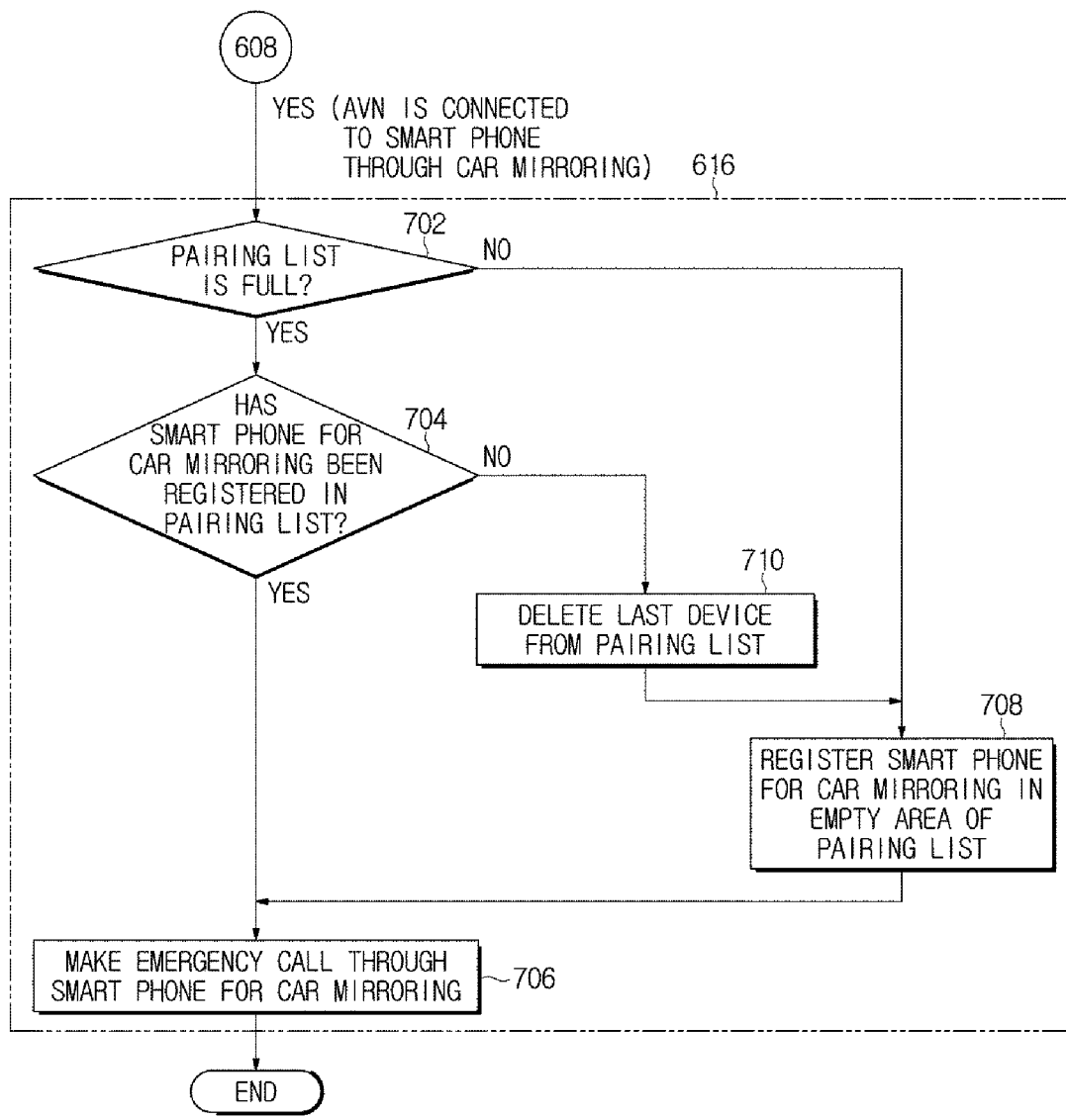
FIG. 7 is a flowchart illustrating a first embodiment of a method of making an emergency call when an AVN is connected to a smart phone through car mirroring in a vehicle according to embodiments of the present disclosure.

FIG. 7 is a flowchart illustrating a first embodiment of a method of making an emergency call when the AVN 200 is connected to a smart phone through car mirroring in the vehicle 100 according to embodiments of the present disclosure. According to the method of making the emergency call, as shown in FIG. 7, when the pairing list is full of a maximum number of registered devices, the controller 312 may delete one of the registered devices from the pairing list, register a smart phone for car mirroring in the pairing list, and then try to make an emergency call. Herein, the smart phone for car mirroring means a smart phone connected to the AVN 200 through car mirroring.

In order to attempt to make an emergency call when the AVN 200 is connected to the smart phone through car mirroring, the controller 312 may determine whether the pairing list of the AVN 200 is full of a maximum number of devices, in operation 702. If a maximum number of devices that can be registered in the pairing list is five, as shown in FIG. 5B, the controller 312 may determine whether five devices have already been registered in the pairing list.

If the pairing list is full of the maximum number of devices ("Yes" in operation 702), as shown in FIG. 5B, the controller 312 may determine whether the smart phone for car mirroring has been registered in the pairing list, in operation 704. If the controller 312 determines that the smart phone for car mirroring has been registered in the pairing list, the controller 312 may try to make an emergency call through the smart phone for car mirroring. If the controller 312 determines that the smart phone for car mirroring has not been registered in the pairing list, the controller 312 may need to register the smart phone for car mirroring in the pairing list in order to try to make an emergency call.

If the controller 312 determines that the smart phone for car mirroring has been registered in the pairing list ("Yes" in operation 704), the controller 312 may try to make an emergency call through the smart phone for car mirroring, in operation 706. The emergency call may be made by dialing a predetermined telephone number. For example, if a default number for making an emergency call is "911", the emergency call may be made by dialing "1", "1", and "9" in this order. As another example, if a default number for making an emergency call is "070-XXXX-YYYY" that is a telephone number for an emergency rescue service of insurance company, the emergency call may be made by dialing "0", "7", "0", "X", "X", "X", "X", "Y", "Y", "Y", and "Y" in this order.

Returning again to operation 702, if the controller 312 determines that the pairing list is not full of the maximum number of devices, that is, that the pairing list has at least one empty area ("No" in operation 702), as shown in FIG. 5A, the controller 312 may register the smart phone for car mirroring in the empty area, in operation 708. Then, the controller 312 may try to make an emergency call through the smart phone for car mirroring, in operation 706.

Returning again to operation 704, if the controller 312 determines that the pairing list is full of the maximum number of devices ("Yes" in operation 702) and that the smart phone for car mirroring has not been registered in the pairing list ("No" in operation 704), the controller 312 may delete one (for example, a device last registered) among the devices registered in the pairing list to create an empty area in the pairing list, in operation 710. Then, the controller 312 may register the smart phone for car mirroring in the empty area created by deleting the device, in operation 708. Then, the controller 312 may try to make an emergency call through the smart phone for car mirroring, in operation 706.

Figure 8:
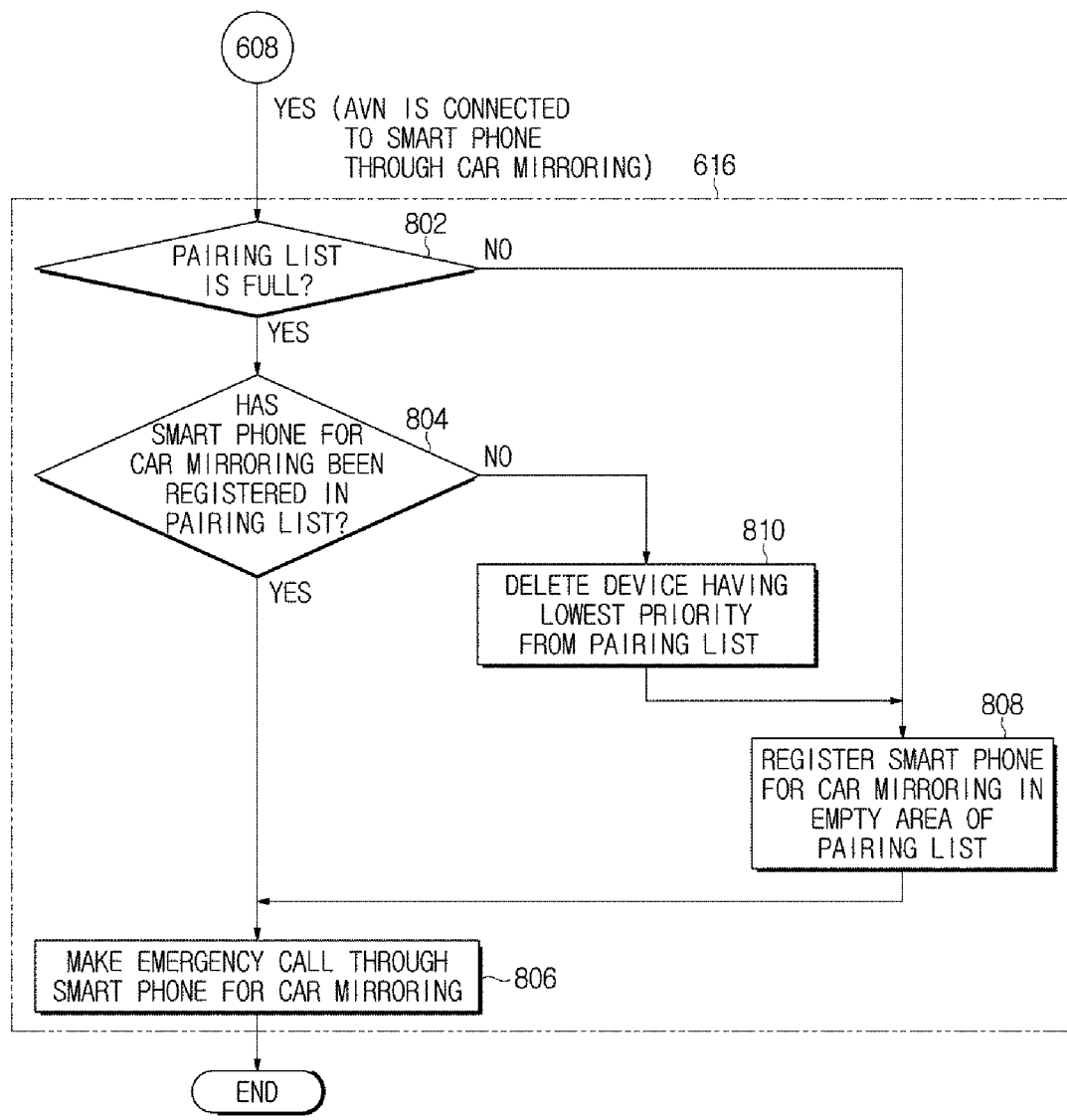
FIG. 8 is a flowchart illustrating a second embodiment of a method of making an emergency call when an AVN is connected to a smart phone through car mirroring in a vehicle according to embodiments of the present disclosure.

FIG. 8 is a flowchart illustrating a second embodiment of a method of making an emergency call when the AVN 200 is connected to a smart phone through car mirroring in the vehicle 100 according to embodiments of the present disclosure. According to the method of making the emergency call, as shown in FIG. 8, when the pairing list is full of a maximum number of registered devices, the controller 312 may delete a device having a lowest priority among the registered devices, register a smart phone for car mirroring in the pairing list, and then try to make an emergency call. Herein, the smart phone for car mirroring means a smart phone connected to the AVN 200 through car mirroring.

In order to attempt to make an emergency call when the AVN 200 is connected to the smart phone through car mirroring, the controller 312 may determine whether the pairing list of the AVN 200 is full of a maximum number of devices, in operation 802. If a maximum number of devices that can be registered in the pairing list is five, as shown in FIG. 5B, the controller 312 may determine whether five devices have been registered in the pairing list.

If the pairing list is full of the maximum number of devices ("Yes" in operation 802), as shown in FIG. 5B, the controller 312 may determine whether the smart phone for car mirroring has been registered in the pairing list, in operation 804. If the controller 312 determines that the smart phone for car mirroring has been registered in the pairing list, the controller 312 may try to make an emergency call through the smart phone for car mirroring. If the controller 312 determines that the smart phone for car mirroring has not been registered in the pairing list, the controller 312 may need to register the smart phone for car mirroring in the pairing list in order to try to make an emergency call.

If the controller 312 determines that the smart phone for car mirroring has already been registered in the pairing list ("Yes" in operation 804), the controller 312 may try to make an emergency call through the smart phone for car mirroring, in operation 806. The emergency call may be made by dialing a predetermined telephone number. For example, if a default number for making an emergency call is "911", the emergency call may be made by dialing "1", "1", and "9" in this order. As another example, if a default number for making an emergency call is "070-XXXX-YYYY" that is a telephone number for an emergency rescue service of insurance company, the emergency call may be made by dialing "0", "7", "0", "X", "X", "X", "X", "Y", "Y", "Y", and "Y" in this order.

Returning again to operation 802, if the controller 312 determines that the pairing list is not full of the maximum number of devices, that is, that the pairing device has at least one empty area ("No" in operation 802), as shown in FIG. 5A, the controller 312 may register the smart phone for car mirroring in the empty area, in operation 808. Then, the controller 312 may try to make an emergency call through the smart phone for car mirroring, in operation 806.

Returning again to operation 804, if the controller 312 determines that the pairing list is full of the maximum number of devices ("Yes" in operation 802) and that the smart phone for car mirroring has not been registered in the pairing list ("No" in operation 804), the controller 312 may delete a device having a lowest priority among the devices registered in the pairing list to create an empty area in the pairing list, in operation 810. By classifying the devices registered in the pairing list according to their priorities and deleting a device having a lowest priority, it is possible to ensure an empty area for registering the smart phone for car mirroring while minimizing a user's inconvenience that may occur by deleting the device. Since the lowest priority means relatively low importance in view of a user, deleting the device having the lowest priority can relatively minimize a user's inconvenience, compared to deleting another device having the higher importance (that is, the higher priority). Then, the controller 312 may register the smart phone for car mirroring in the empty area created by deleting the device, in operation 808. Then, the controller 312 may try to make an emergency call through the smart phone for car mirroring, in operation 806.

Figure 9:
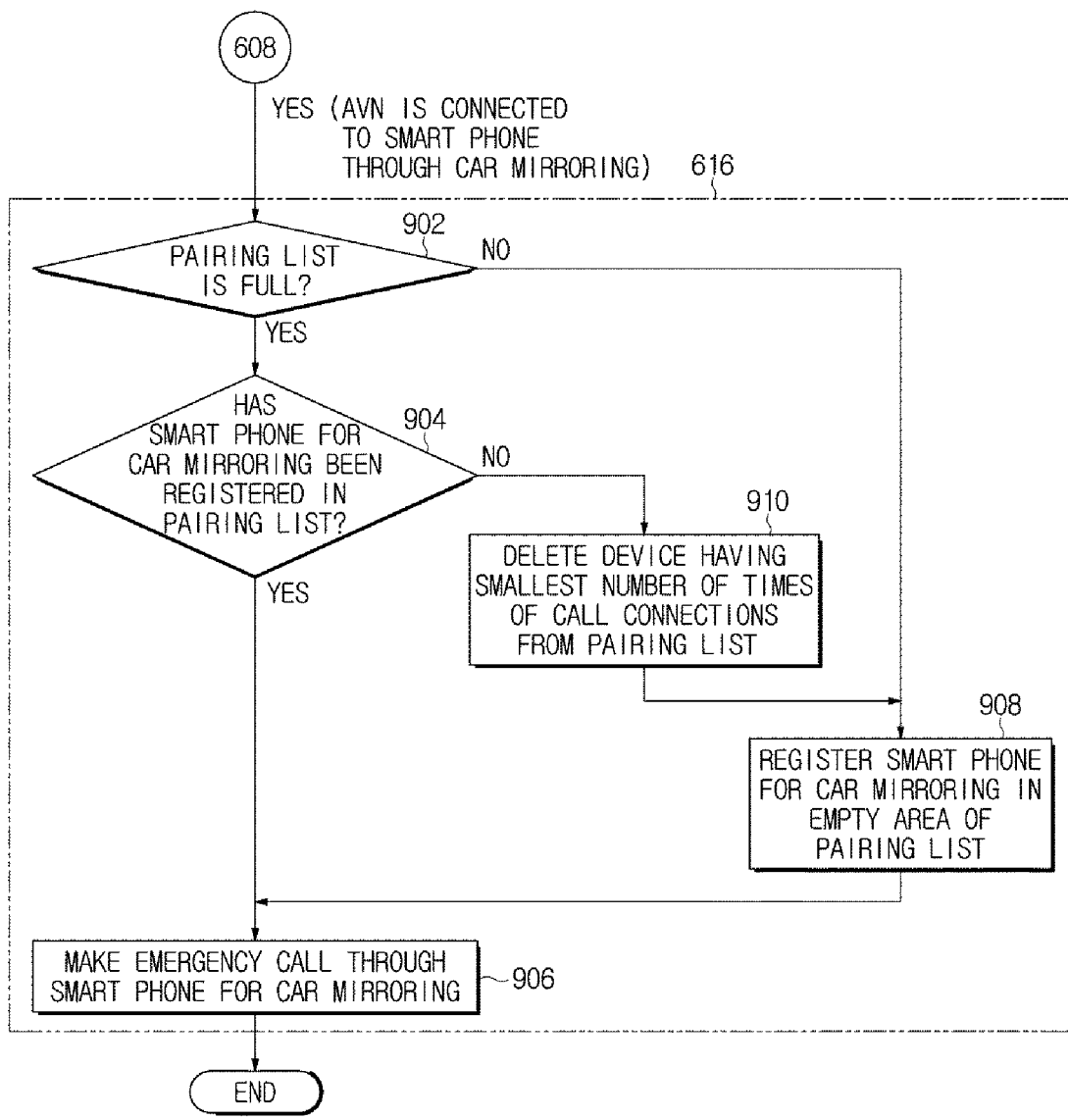
FIG. 9 is a flowchart illustrating a third embodiment of a method of making an emergency call when an AVN is connected to a smart phone through car mirroring in a vehicle according to embodiments of the present disclosure.

FIG. 9 is a flowchart illustrating a third embodiment of a method of making an emergency call when the AVN 200 is connected to a smart phone through car mirroring in the vehicle 100 according to embodiments of the present disclosure. According to the method of making the emergency call, as shown in FIG. 9, when the pairing list is full of a maximum number of registered devices, the controller 312 may delete a device having a smallest number of times of call connections among the registered devices, register a smart phone for car mirroring in the pairing list, and then try to make an emergency call. Herein, the smart phone for car mirroring means a smart phone connected to the AVN 200 through car mirroring.

In order to attempt to make an emergency call when the AVN 200 is connected to the smart phone through car mirroring, the controller 312 may determine whether the pairing list of the AVN 200 is full of a maximum number of devices, in operation 902. If a maximum number of devices that can be registered in the pairing list is five, as shown in FIG. 5B, the controller 312 may determine whether five devices have been registered in the pairing list.

If the pairing list is full of the maximum number of devices ("Yes" in operation 902), as shown in FIG. 5B, the controller 312 may determine whether the smart phone for car mirroring has been registered in the pairing list, in operation 904. If the controller 312 determines that the smart phone for car mirroring has been registered in the pairing list, the controller 312 may try to make an emergency call through the smart phone for car mirroring. If the controller 312 determines that the smart phone for car mirroring has not been registered in the pairing list, the controller 312 may need to register the smart phone for car mirroring in the pairing list in order to try to make an emergency call.

If the controller 312 determines that the smart phone for car mirroring has been registered in the pairing list ("Yes" in operation 904), the controller 312 may try to make an emergency call through the smart phone for car mirroring, in operation 906. The emergency call may be made by dialing a predetermined telephone number. For example, if a default number for making an emergency call is "911", the emergency call may be made by dialing "1", "1", and "9" in this order. As another example, if a default number for making an emergency call is "070-XXXX-YYYY" that is a telephone number for an emergency rescue service of insurance company, the emergency call may be made by dialing "0", "7", "0", "X", "X", "X", "X", "Y", "Y", "Y", and "Y" in this order.

Returning again to operation 902, if the controller 312 determines that the pairing list is not full of the maximum number of devices, that is, that the pairing list has at least one empty area ("No" in operation 902), as shown in FIG. 5A, the controller 312 may register the smart phone for car mirroring in the empty area, in operation 908. Then, the controller 312 may try to make an emergency call through the smart phone for car mirroring, in operation 906.

Returning again to operation 904, if the controller 312 determines that the pairing list is full of the maximum number of devices ("Yes" in operation 902) and that the smart phone for car mirroring has not been registered in the pairing list ("No" in operation 904), the controller 312 may delete a device having a smallest number of times of call connections among the devices registered in the pairing list to create an empty area in the pairing list, in operation 910. By classifying the devices registered in the pairing list according to the numbers of times of call connections and deleting a device having a smaller number of times of call connections, it is possible to ensure an empty area for registering the smart phone for car mirroring while minimizing a user's inconvenience that may occur by deleting the device. Since the smaller number of times of call connections means the lowest frequency in use, deleting the device having the smallest number of times of call connections can relatively minimize a user's inconvenience, compared to deleting another device having the greater number of times of call connections. Then, the controller 312 can register the smart phone for car mirroring in the empty area created by deleting the device, in operation 908. Then, the controller 312 may try to make an emergency call through the smart phone for car mirroring, in operation 906.

Figure 10:
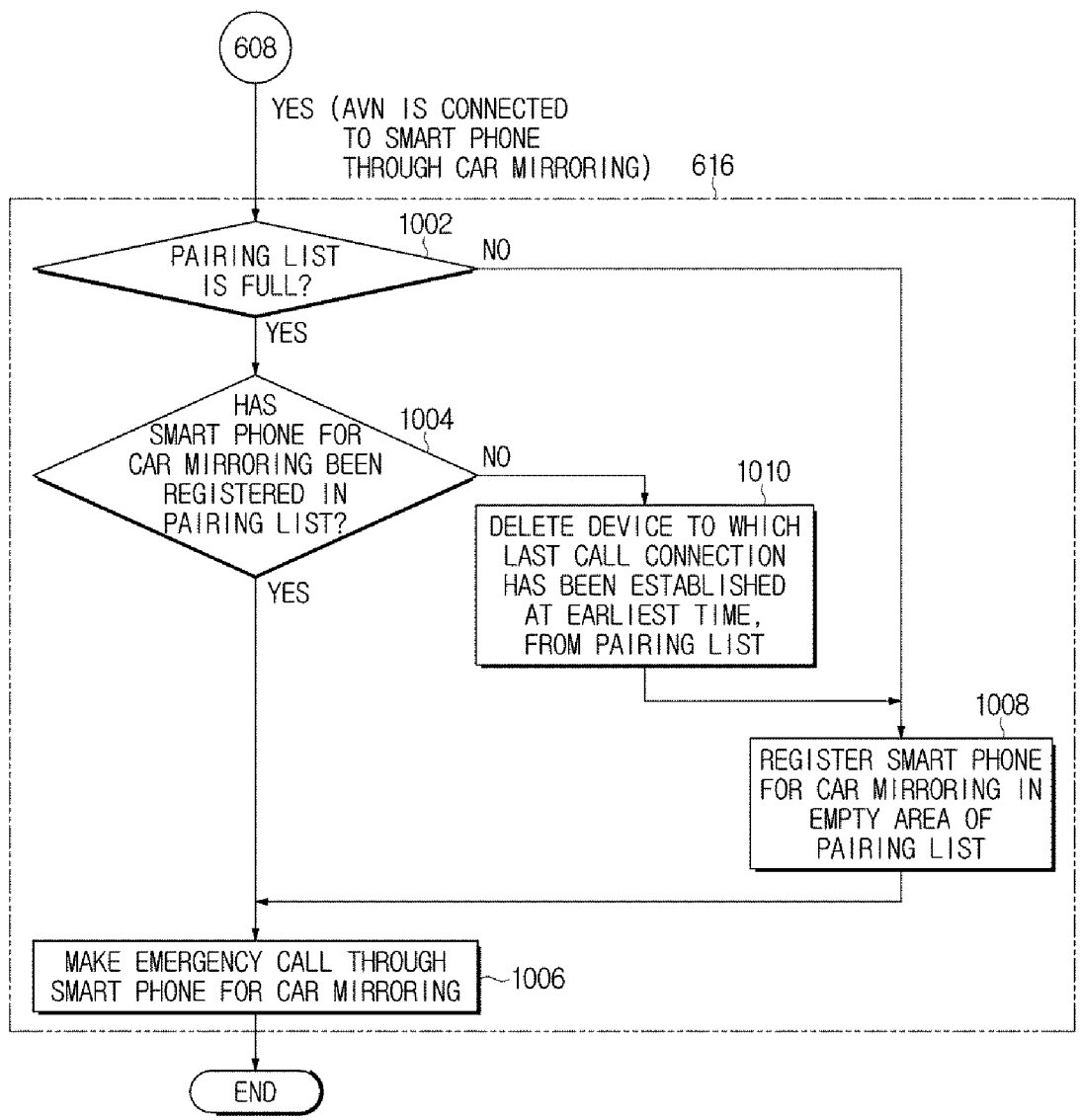
FIG. 10 is a flowchart illustrating a fourth embodiment of a method of making an emergency call when an AVN is connected to a smart phone through car mirroring in a vehicle according to embodiments of the present disclosure.

FIG. 10 is a flowchart illustrating a fourth embodiment of a method of making an emergency call when the AVN 200 is connected to a smart phone through car mirroring in the vehicle 100 according to embodiments of the present disclosure. According to the method of making the emergency call, as shown in FIG. 10, when the pairing list is full of a maximum number of registered devices, the controller 312 may delete a device to which a last call connection has been established at an earliest time among the registered devices, register a smart phone for car mirroring, and then try to make an emergency call. Herein, the smart phone for car mirroring means a smart phone connected to the AVN 200 through car mirroring.

In order to attempt to make an emergency call when the AVN 200 is connected to the smart phone through car mirroring, the controller 312 may determine whether the pairing list of the AVN 200 is full of a maximum number of devices, in operation 1002. If a maximum number of devices that can be registered in the pairing list is five, as shown in FIG. 5B, the controller 312 may determine whether five devices have been registered in the pairing list.

If the pairing list is full of the maximum number of devices ("Yes" in operation 1002), as shown in FIG. 5B, the controller 312 may determine whether the smart phone for car mirroring has been registered in the pairing list, in operation 1004. If the controller 312 determines that the smart phone for car mirroring has been registered in the pairing list, the controller 312 may try to make an emergency call through the smart phone for car mirroring. If the controller 312 determines that the smart phone for car mirroring has not been registered in the pairing list, the controller 312 may need to register the smart phone for car mirroring in the pairing list in order to try to make an emergency call.

If the controller 312 determines that the smart phone for car mirroring has been registered in the pairing list ("Yes" in operation 1004), the controller 312 may try to make an emergency call through the smart phone for car mirroring, in operation 1006. The emergency call may be made by dialing a predetermined telephone number. For example, if a default number for making an emergency call is "911", the emergency call may be made by dialing "1", "1", and "9" in this order. As another example, if a default number for making an emergency call is "070-XXXX-YYYY" that is a telephone number for an emergency rescue service of insurance company, the emergency call may be made by dialing "0", "7", "0", "X", "X", "X", "X", "Y", "Y", "Y", and "Y" in this order.

Returning again to operation 1002, if the controller 312 determines that the pairing list is not full of the maximum number of devices, that is, that the pairing list has at least one empty area ("No" in operation 1002), as shown in FIG. 5A, the controller 312 may register the smart phone for car mirroring in the empty area, in operation 1008. Then, the controller 312 may try to make an emergency call through the smart phone for car mirroring, in operation 1006.

Returning again to operation 1004, if the controller 312 determines that the pairing list is full of the maximum number of devices ("Yes" in operation 1002) and that the smart phone for car mirroring has not been registered in the pairing list ("No" in operation 1004), the controller 312 may delete a device to which a last call connection has been established at an earliest time, among the devices registered in the pairing list to create an empty area in the pairing list, in operation 1010. By classifying the devices registered in the pairing list according to times at which last call connections have been established and deleting a device to which a last call connection has been established at an earliest time, it is possible to ensure an empty area for registering the smart phone for car mirroring while minimizing a user's inconvenience that may occur by deleting the device. Since the earliest time at which a last call connection has been established means relatively low importance, deleting the device to which a last call connection has been established at the earliest time can relatively minimize a user's inconvenience, compared to deleting another device used lately. Then, the controller 312 can register the smart phone for car mirroring in the empty area created by deleting the device, in operation 1008. Then, the controller 312 may try to make an emergency call through the smart phone for car mirroring, in operation 1006.

According to an aspect of the present disclosure, by automatically registering a communication terminal and making an emergency call in the state that the communication terminal is connected to a multimedia device through car mirroring, although the communication terminal has not been registered in a pairing list of the multimedia device, it is possible to promptly deal with a traffic accident.

The aforementioned descriptions are only for illustrative purposes, and it will be apparent that those skilled in the art can make various corrections, modifications, and substitutions thereto without changing the technical spirit and essential features of the present disclosure. Thus, it should be understood that the embodiments described above and the accompanying drawings are merely for illustrative purposes and not for limitation purposes in all aspects.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method for controlling an outgoing call in a vehicle, comprising:
   when a communication terminal connected to a multimedia device through car mirroring has not been registered in a pairing list of the multimedia device, deleting at least one device among a plurality of devices registered in the pairing list, and registering the communication terminal in the pairing list;
   attempting to make a call through the communication terminal when it has been registered in the pairing list, and
   deleting the at least one device among the plurality of devices registered in the pairing list when the pairing list includes no area in which the communication terminal can be registered,
   wherein the at least one deleted device includes at least one of a device having a smallest number of call connections among the plurality of devices registered in the pairing list and a device with which a last call connection has been established at an earliest time among the plurality of devices registered in the pairing list.

2. The method according to claim 1, wherein the deleting of the at least one device among the plurality of devices registered in the pairing list comprises deleting a device that was last registered among the plurality of devices registered in the pairing list.

3. The method according to claim 1, wherein the deleting of the at least one device among the plurality of devices registered in the pairing list comprises deleting a device having a lowest priority among the plurality of devices registered in the pairing list.

4. The method according to claim 1, wherein the call is an automatic outgoing call for automatically dialing a predetermined telephone number when the vehicle encounters a traffic accident.

5. The method according to claim 1, further comprising, when the communication terminal was already registered in the pairing list of the multimedia device, attempting to make a call through the communication terminal.

6. The method according to claim 1, further comprising, when the pairing list includes an area in which the communication terminal can be registered, registering the communication terminal in the pairing list, and attempting to make the call through the communication terminal.

7. An apparatus for making a call in a vehicle, comprising:
   a multimedia device including a controller; and
   a communication terminal connected to the multimedia device through car mirroring, wherein
   when the communication terminal has not been registered in a pairing list of the multimedia device, the controller of the multimedia device deletes at least one device among a plurality of devices registered in the pairing list, registers the communication terminal in the pairing list, and attempts to make a call through the communication terminal when it has been registered in the pairing list,
   when the pairing list includes no area in which the communication terminal can be registered, the controller deletes the at least one device among the plurality of devices registered in the pairing list, and
   the at least one deleted device includes at least one of a device having a smallest number of call connections among the plurality of devices registered in the pairing list and a device with which a last call connection has been established at an earliest time among the plurality of devices registered in the pairing list.

8. The apparatus according to claim 7, wherein the controller deletes a device that was last registered among the plurality of devices registered in the pairing list.

9. The apparatus according to claim 7, wherein the controller deletes a device having a lowest priority among the plurality of devices registered in the pairing list.

10. The apparatus according to claim 7, wherein the call is an automatic outgoing call for automatically dialing a predetermined telephone number when the vehicle encounters a traffic accident.

11. The apparatus according to claim 7, wherein when the communication terminal was already registered in the pairing list of the multimedia device, the controller attempts to make a call through the communication terminal.

12. The apparatus according to claim 7, wherein when the pairing list includes an area in which the communication terminal can be registered, the controller registers the communication terminal in the pairing list, and attempts to make the call through the communication terminal.

13. A method for controlling an outgoing call in a vehicle, comprising:
   when a communication terminal is connected to a multimedia device through car mirroring, determining whether a pairing list of the multimedia device includes an area in which the communication terminal can be registered;
   when the pairing list includes no area in which the communication terminal can be registered, and the communication terminal has already been registered in the pairing list, attempting to make a call through the communication terminal;
   when the pairing list includes the area in which the communication terminal can be registered, registering the communication terminal in the area of the pairing list, and attempting to make a call through the communication terminal; and when the pairing list includes no area in which the communication terminal can be registered, and the communication terminal has not been registered in the pairing list, deleting at least one device among a plurality of devices registered in the pairing list to create an area in the pairing list in which the communication terminal can be registered, registering the communication terminal in the created area of the pairing list, and attempting to make a call through the communication terminal, wherein the at least one deleted device includes at least one of a device having a smallest number of call connections among the plurality of devices registered in the pairing list and a device with which a last call connection has been established at an earliest time among the plurality of devices registered in the pairing list.

* * * * *